Jan. 8, 1963 W. H. HOLCROFT 3,072,266
MATERIAL HANDLING APPARATUS
Filed June 15, 1959 3 Sheets-Sheet 3
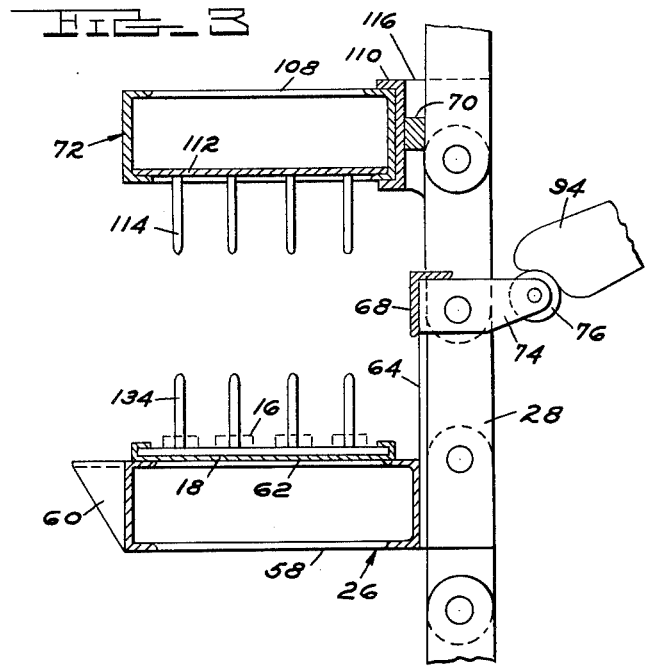
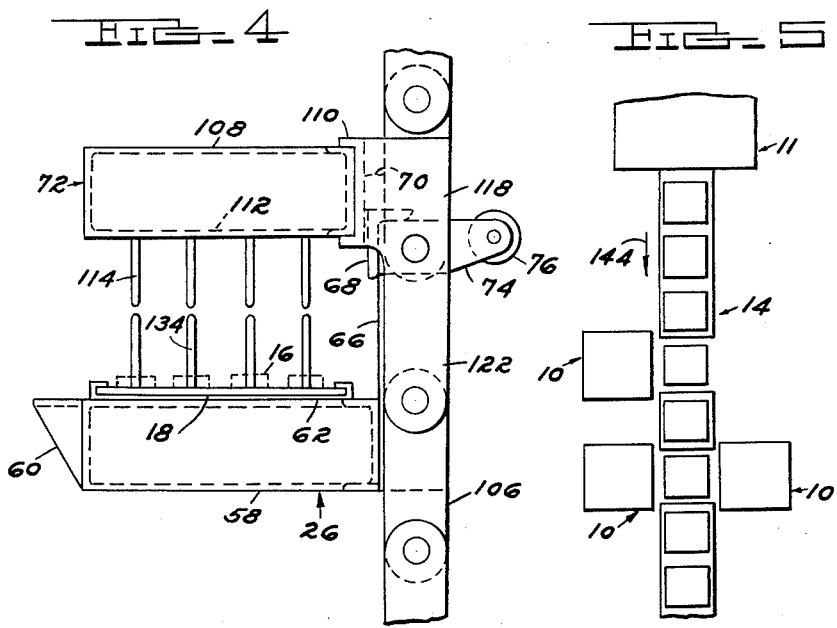
INVENTOR.
WALTER H. HOLCROFT
BY Whittemore
Hulbert & Belknap
ATTORNEYS United States Patent Office 3,072,266
Patented Jan. 8, 1963

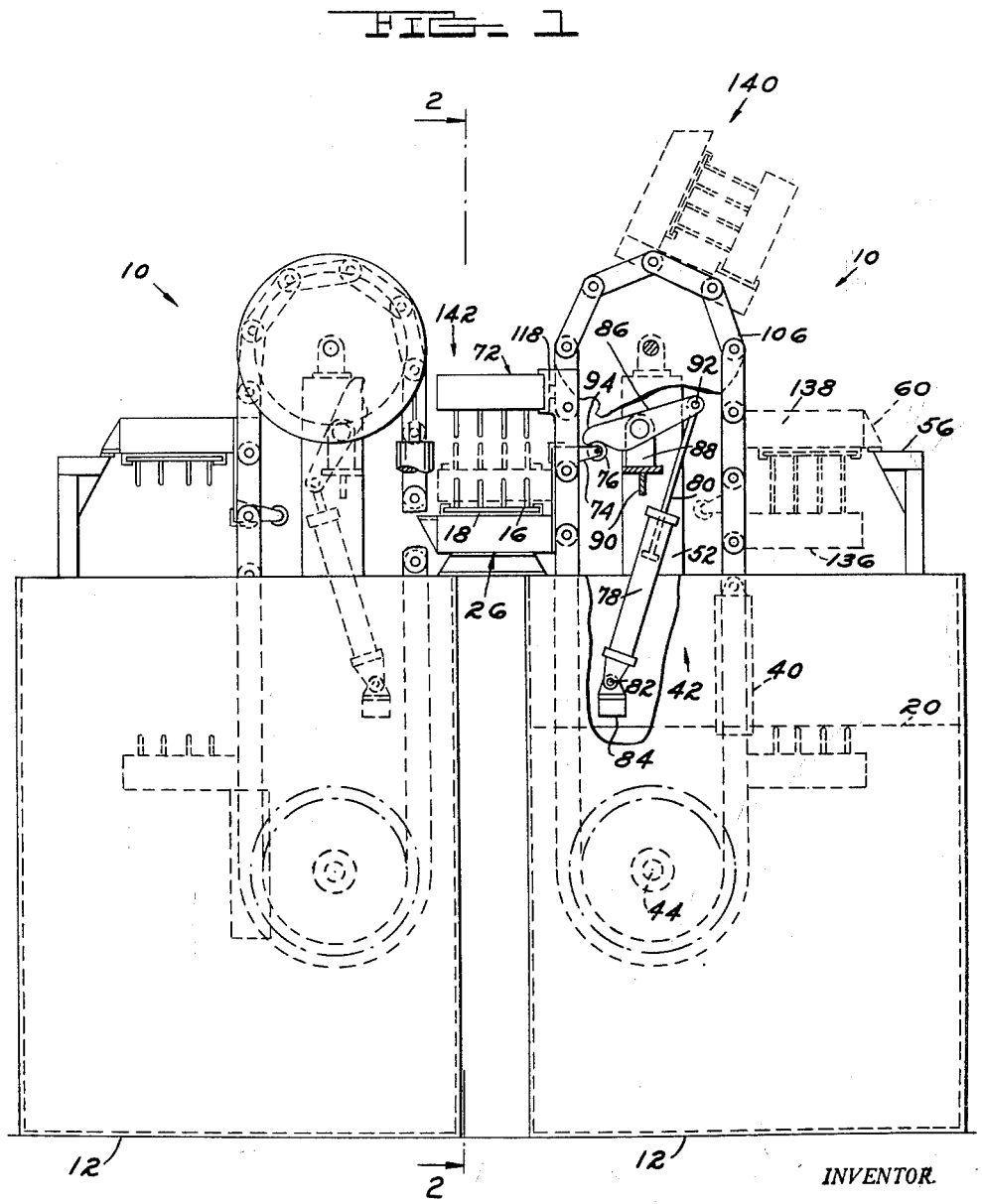

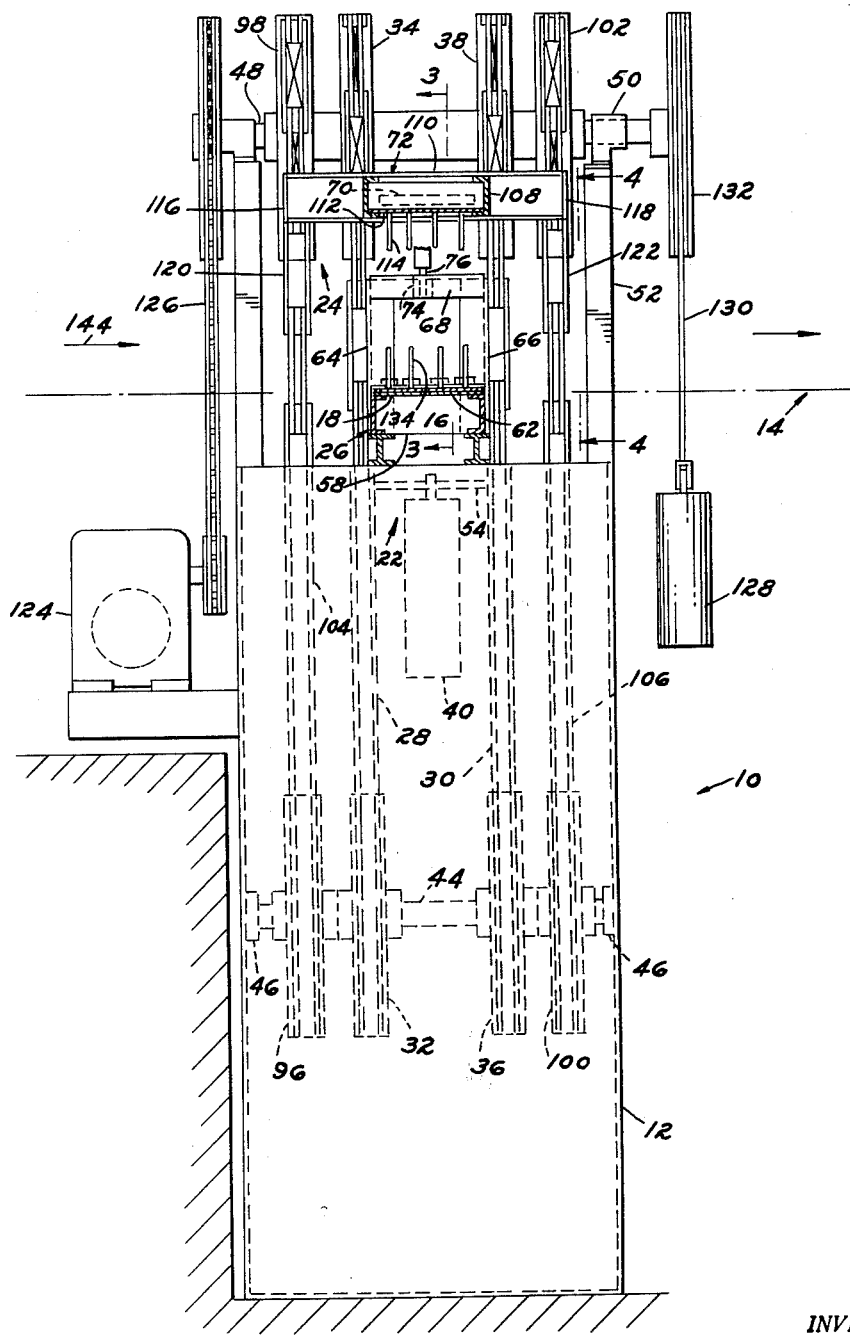

3,072,266
MATERIAL HANDLING APPARATUS
Walter H. Holcroft, Detroit, Mich., assignor to Holcroft & Company, Detroit, Mich., a corporation of Michigan
Filed June 15, 1959, Ser. No. 820,359
8 Claims. (Cl. 214—1)

The present invention relates to material handling apparatus and refers more particularly to apparatus for selectively transferring articles from a first location to a second location and back to the first location, said apparatus inverting the articles while transferring them to said second location and again while transferring them back to the first location.

In industry and particularly in the metal treating industry it is often necessary to selectively quench hot articles in a liquid quenching media immediately after removal of the articles from a heating means. To insure quenching of the articles at the proper time it is necesary to transfer the articles at a controlled speed into the quenching media and it is desirable to perform such transfer without appreciable free fall of the articles. In the past this controlled, selective quenching operation was found to be economically performed only when the supporting trays or fixtures used to carry the articles through the heating means were quenched with the articles.

The quenching of the hot supporting trays or fixtures with the articles supported thereby is undesirable since such trays and fixtures are used repeatedly in the same process and are subject to rapid deterioration on repeated quenching. To remove the hot articles from their trays or supports, quench them, and replace them on their trays or supports without permitting undesirable free fall thereof by hand or with existing material handling apparatus is an unsatisfactory time consuming process which is uneconomical of labor and which allows objectionable cooling of the articles before quenching is accomplished.

Therefore one of the essential objects of the present invention is to provide means for selectively immersing in a liquid media articles delivered to said means on supports or trays without immersing said trays or supports.

Another object is to provide means for selectively quenching hot articles delivered to said means on supports or trays without quenching said trays or supports wherein the speed of the quenching is controlled and the articles are not subjected to appreciable free fall.

Another object is to provide material handling apparatus for transferring articles from one location to another location whereby the articles arrive in the second location in an inverted position with respect to their position at the first location and the speed of said transfer is controlled.

Another object is to provide material handling apparatus for transferring articles from a conveyor into a container and back to the conveyor including means for inverting the articles as they are transferred to and again as they are transferred from the container.

More specifically it is an object of the present invention to provide material handling apparatus for transferring hot articles moving on trays or supports on a conveyor into a container containing quenching media in an inverted position without said tray or support and subsequently transfer the articles back to the conveyor in their original position on said trays or supports at a controlled speed and without permitting appreciable free fall of the articles, including a loading platform operable to receive and lift individual trays or supports from said conveyor and to transfer said articles thereon in an inverted position without said tray or support to a quench elevator which is also a part of said apparatus, said quench elevator then operating to lower said articles into said quenching media, raise them therefrom, reinvert them, and deposit said articles back on said tray or support on said loading platform, the loading platform being subsequently operable to position said articles and tray for removal therefrom and replacement on said conveyor.

These and other objects and features of the present invention will become apparent as the description proceeds, especially when taken in conjunction with the accompanying drawings, illustrating a preferred embodiment of the invention wherein:

FIGURE 1 is a side view of two material handling apparatus according to the invention, parts of which are shown partly broken away and which are positioned as they would be on opposite sides of a conveyor for selective operation.

FIGURE 2 is an enlarged section of the material handling apparatus of FIGURE 1 taken on line 2—2 in FIGURE 1.

FIGURE 3 is an enlarged section of a portion of the material handling apparatus of FIGURE 1 taken on the line 3—3 in FIGURE 2.

FIGURE 4 is an enlarged section of the material handling apparatus of FIGURE 1 taken on the line 4—4 in FIGURE 2.

FIGURE 5 is a diagrammatic plan view of a typical installation of the material handling apparatus of the invention showing the relation thereof to a furnace, and a conveyor for feeding said apparatus and for receiving quenched articles from said apparatus.

Referring now to the drawings a particular embodiment of the invention will be described. As shown in FIGURE 5 two or more selectively operable material handling apparatus generally indicated 10 according to the invention may be provided in conjunction with a furnace 11 and a conveyor 14 to accomplish the selective heat treating of articles 16 passing through the furnace 11 on conveyor 14. As indicated a pair of material handling apparatus 10 may be positioned for alternate operation on opposite sides of a conveyor at the same point thereon or individual apparatus 10 may be positioned at different points along the conveyor 14.

The individual material handling apparatus 10 according to the invention as best shown in FIGURES 1 and 2 may be selectively operated at a controlled speed to receive articles 16, traveling on a support or tray 18 on conveyor 14, to lift them from the conveyor 14 to invert the articles, to place the articles without the tray or support and without appreciable free fall of the articles in the respective container 12 associated with the particular apparatus 10, and subsequently to remove the articles 16 from the container 12, to reinvert the articles, to replace them on the tray 18 without appreciable free fall of the articles and to reposition tray 18 for movement onto conveyor 14.

The conveyor 14 in the illustrated embodiment of the invention is adapted to carry articles 16 to be heat treated through a furnace 11, indicated diagrammatically in FIGURE 5, on trays or supports 18 where the articles are heated. The individual apparatus 10 is particularly suited to quenching the hot articles 16 as they come from the furnace in a quenching media 20 stored in the container 12 associated with the individual apparatus without quenching the supports or trays. Providing a plurality of apparatus 10 along conveyor 14 as shown in FIGURE 5 permits selective quenching of the hot articles in different media 20 as they proceed along conveyor 14.

As previously indicated the quenching of the hot articles 16 without quenching the tray on which the articles pass through the furnace is very desirable since the trays are also hot when they come from the furnace, are used repeatedly to carry different articles through the furnace and are subject to rapid deterioration on repeated quenching after passage through the furnace.

Controlling the speed at which articles 16 are transferred between the conveyor 14 and quenching media 20 permits greater control of the temperature at which the articles are quenched. Limiting the free fall of the articles as they are transferred prevents unnecessary strains on the articles and also prevents splashing of the quenching media. The inverting of the articles as they are transferred facilitates drainage thereof.

The individual apparatus 10 which performs the transferring and quenching of the articles 16 according to the invention comprises a first means generally indicated 22 for receiving the articles 16 and tray 18 from the conveyor 14, for lifting them from the conveyor 14 at a controlled speed, for securely holding the tray 18 and for inverting the tray 18 and articles 16 and a second means generally indicated 24 for receiving the inverted articles 16 without the tray 18 after a limited free fall thereof, submerging them in the quenching media, raising the quenched article from the quenching media, reinverting the articles and depositing the articles in their original position on the tray 18 at a controlled speed without appreciable free fall of the articles. The first means is then opeable to place the heat treated articles and the tray back in position to be moved along conveyor 14 also at a controlled speed.

As shown in the figures means 22 comprises a loading platform generally indicated 26, a pair of endless long pitch chains 28 and 30, two sets of spaced apart sprockets 32 and 34, and 36 and 38 respectively, counterweight 40, depression mechanism for loading platform 26 generally indicated 42 and the necessary mounting and support means therefor.

Sprockets 32 and 36 as best shown in FIGURE 2 are mounted within the container 12 associated with the particular apparatus 10 on an axle 44 which is supported at the ends for free rotation in bearings 46 secured to opposite walls of the container 12. Sprockets 32 and 36 are mounted for free rotation on axle 44. Sprockets 34 and 38 as shown best in FIGURE 2 are mounted for free rotation on an axle 48 which is supported for free rotation in bearings 50 secured to the top of posts 52 attached to and extending above container 12. Sprockets 32 and 34, and sprockets 36 and 38 are vertically in line as shown in FIGURE 2 to form spaced apart sets of sprockets.

Endless long pitch chain 28 as shown is mounted on sprockets 32 and 34 for movement therewith. Likewise, endless long pitch chain 30 is mounted on sprockets 36 and 38. Sprockets 32, 34, 36 and 38 and chains 28 and 30 are identical. Counterweight 40 is attached between chains 28 and 30 by convenient means such as strap 54 secured to links of the chains 28 and 30 as best shown in FIGURE 2. Counterweight 40 serves as motor means for means 22 to cause the chains 28 and 30 and the loading platform 26 attached thereto to move around the sprockets 32, 34, 36 and 38 and to assume a rest position against abutment 56 attached to container 12 as will later be considered.

Loading platform 26 is rigidly attached to long pitch chains 28 and 30 as shown best in FIGURES 2 and 3. The loading platform 26 includes a frame 58 formed from structural shapes as shown, an abutment 60 attached to the edge of frame 58 in position to engage abutment 56 during operation of apparatus 10 and a suitable cover member 62 for the frame 58 adapted to receive and hold securely a tray 18 which enters onto platform 26 from conveyor 14.

Loading platform 26 is attached to angle members 64 and 66 one leg of each of which forms a side bar for a link of chains 28 and 30 respectively. The other legs of the angle members 64 and 66 extend toward each other as shown to provide surfaces on the lower portion of which platform 26 is attached by welding or other convenient means. An abutment angle 68 is secured as by welding between the upper ends of the angle members 64 and 66 as shown. In operation angle 68 abuts a complementary abutment bar 70 on quench elevator generally indicated 72 and insures that elevator 72 and platform 26 maintain a predetermined spacing as they move around the sprockets mounted on axle 48 as will later be considered.

A bracket 74 supporting a wheel 76 is centrally attached to angle 68 by convenient means as shown best in FIGURE 3. Bracket 74 and wheel 76 cooperate with the depression mechanism 42 for the loading platform 26 to cause the loading platform 26 to be depressed into position to receive a tray 18 from conveyor 14 on actuation of depression mechanism 42 as will later be explained.

The depression mechanism 42 for the lift elevator 26 is best shown in FIGURE 1 and includes hydraulic cylinder 78 and its associated piston and piston rod 80 pivotally mounted on an axle 82 extending between the sides of container 12 and attached thereto by brackets 84. The depression mechanism also includes lever 86 shaped as shown in FIGURE 1 and pivotally mounted centrally on bracket 88 secured to structural member 90 between posts 52. As shown the end 92 of lever 86 is pivotally attached to the end of piston rod 80. The end 94 of lever 86 engages wheel 76 supported on the loading platform 26 when piston rod 80 is extended as shown at the right in FIGURE 1 to depress the loading platform 26 as later explained.

Second means 24 also as shown in FIGURE 2 includes two sets of vertically aligned sprockets 96 and 98, and 100 and 102 respectively, a pair of long pitch chains 104 and 106 and a quench elevator generally indicated 72. Sprockets 96 and 98, and 100 and 102 are similar to sprockets 32, 34, 36 and 38 and are mounted on axles 44 and 48. Sprockets 96 and 100 are freely rotatable on axle 44. Sprockets 98 and 102 are securely attached to axle 48 for rotation therewith. Long pitch chains 104 and 106 have the same pitch as chains 28 and 30 and as shown are mounted on sprocket sets 96 and 98, and 100 and 102 respectively for movement therearound. Quench elevator 72 is mounted between chains 104 and 106 for movement therewith.

Quench elevator 72 comprises a frame 108 including a mounting channel 110, a flat cover plate 112 to which rods 114 are fastened, and an abutment bar 70 previously referred to. As shown best in FIGURES 3 and 4 elevator 72 is secured by means of mounting channel 110 to extensions 116 and 118 on the ends of aligned links 120 and 122 respectively of long pitch chains 104 and 106. Extensions 116 and 118 are formed to position elevator 72 so that in operation elevator 72 is in alignment with loading platform 26 so that channel 110 does not contact chains 28 and 30.

Each apparatus 10 is also provided with suitable power unit and drive means 124 and 126 for positively driving axle 48 in both clockwise and counterclockwise directions at a controlled speed. A counter-counterweight 128 is provided on the end of axle 48 supported by cable 130 wrapped around drum 132 which is secured to the axle 48. Weight 128 is provided to offset the effect of counterweight 40 on power unit 124 in operation of apparatus 10 as will become evident on consideration of the operation of the apparatus.

In the consideration of the operation of the apparatus illustrated in FIGURE 1 it will be assumed that a substantially flat tray 18 having rods 134 fastened thereto and with annular articles 16 sleeved over rods 134 has just passed through a heating means (not shown) on conveyor 14, that the hot tray and articles are still traveling on conveyor 14, and that it is desired to quench the articles 16 in an inverted position in a selected quenching media 20 in a particular container 12 located along side of the conveyor 14 without quenching the tray 18 and to reposition the articles 16 and tray 18 for further movement on conveyor 14. Also it will be assumed that the quenching is to take place at a controlled speed and without appreciable free fall of the article.

The particular apparatus 10 according to the invention as above disclosed which is associated with the container 12 containing the selected quenching media 20 as indicated at the right in FIGURE 1 will be operated in the desired quenching of the articles 16. Before operation of the apparatus 10 the quench elevator 72 will normally be in the position shown in dotted lines at 136 in FIGURE 1. Loading platform 26 will be in the position shown in dotted lines at 138 in FIGURE 1. Quench elevator 72 in position 136 will normally have the annular articles 16 last quenched in the selected media 20 positioned on rods 114. In position 136 the articles 16 drain before being replaced on conveyor 14. Loading platform 26 is held in position 138 against abutment 56 by counterweight 40 when quench elevator 72 is in or below position 136. When quench elevator 72 contains articles 16 as it will be assumed to at the start of the presently to be described cycle of operation of apparatus 10, the loading platform securely holds the inverted tray 18 in cover member 62 as shown in FIGURES 1 and 3.

With the selected apparatus 10 in the above described condition the power unit 124 associated therewith is caused to be activated by convenient means such as a hand switch in a manner to rotate axle 48 and therefore attached sprockets 98 and 102 in a counter-clockwise direction. The chains 104 and 106 and the attached quench elevator carrying quenched and drained articles 16 will also therefore be moved counter-clockwise at a controlled speed.

As the quench elevator 72 moves up in its counter-clockwise movement the abutment bar 70 attached thereto engages abutment angle 68 secured to loading platform 26. The loading platform 26 is therefore caused to move in a counter-clockwise direction with chains 28 and 30 around sprockets 34 and 38. In this counter-clockwise movement loading platform 26 is pushed by quench elevator 72 with power unit 124 therefor acting against counterweight 40 which tends to cause loading platform 26 to rotate clockwise into position 138 wherein abutments 60 and 56 are engaged as previously explained. Counter counterweight 128 aids the power unit 124 in overcoming the clockwise rotational tendency imparted to the loading platform 26 by counterweight 40.

Loading platform 26 and quench elevator 72 are maintained a predetermined distance apart during their counter-clockwise movement around the sprockets on axle 48 by the relative relationship between the abutting bar 70 and its position on elevator 72 and the abutting angle 68 and its position on loading platform 26. According to the invention this distance is such that when the extensions on links 120 and 122 and the length of angles 64 and 66 are considered the links of chains 28, 30, 104 and 106 to which the platform 26 and elevator 72 are attached will be in the same position relative to movement about the sprockets on axle 48 when angle 68 abuts bar 70. In this manner platform 26 and elevator 72 may be maintained parallel as they round the sprockets on axle 48 in their counter-clockwise rotation as shown at 140 in FIGURE 1 and no appreciable free fall of articles 16 will be possible as they are transferred between the platform 26 and elevator 72.

As the platform 26 and elevator 72 pass through a vertical position and start downward in their counter-clockwise rotation drained and quenched articles 16 are caused by gravity to be transferred in an inverted position from the rods 114 and quench elevator 72 to the rods 134 on tray 18 held by loading platform 26.

When the platform 26 and elevator 72 reach the position 142 shown in FIGURE 1 by elevator 72 in full lines and platform 26 in dotted lines, power unit 124 is caused to cease driving axle 48. Loading platform depression means 42 which has previously been in the position shown on the left in FIGURE 1 with piston rod 80 retracted is then caused by any well known means such as a hydraulic switch to move to the position shown in FIGURE 1 at the right wherein piston rod 80 is extended. Extension of piston rod 80 causes lever 86 to pivot whereby end 94 thereof engages wheel 76 secured to platform 26. As lever 86 is pivoted further loading platform 26 is depressed to the position 142 shown in solid lines in FIGURE 1.

Loading platform 26 in this position places tray 18 carrying the quenched articles 16 in alignment with tray 18 carrying hot articles 16 traveling on conveyor 14. When tray 18 containing articles 16 to be quenched reaches the left side of loading platform 26 in FIGURE 2 traveling in the direction of the arrows 144 it shoves tray 18 carrying quenched articles 16 off of the right side of loading platform 26 back onto conveyor 14 and takes the place thereof on cover member 62 on the depressed loading platform.

Loading platform depression mechanism 42 is then caused to assume the position shown at the right in FIGURE 1 and the loading platform under the influence of counterweight 40 is therefore allowed to raise to the dotted line position shown at 142. In this position the hot articles and hot tray are lifted from their line of travel on conveyor 14, the abutment angle 68 on the platform 26 engages the abutment bar 70 on the quench elevator 72, and the links of chains 28, 30, 104 and 106 carrying the platform and elevator are in line horizontally.

The power unit 124 is then caused to operate in the opposite direction to its previous operation causing rotation of the axle 48, sprockets 98 and 102, chains 104 and 106 and quench elevator 72 in a clockwise direction. Weight 40 acts at this time to keep loading platform 26 following quench elevator 72 as closely as angle 68 in contact with bar 70 will allow. Therefore as quench elevator 72 proceeds clockwise about axle 48 the chains 28, 30, 104 and 106 remain as before in pitch or horizontal alignment so that platform 26 and elevator 72 are always parallel.

As the platform 26 and elevator 72 round the sprockets attached to axle 48 the hot articles 16 are transferred in an inverted position to rods 114 on quench elevator 72 from rods 134 on hot tray 18. Tray 18 remains securely held by platform 26 during the transfer and inversion.

When quench elevator 72 reaches position 136 in its clockwise movement carrying the transferred hot articles 16 followed by platform 26, the abutment 60 on platform 26 engages abutment 56 as shown in FIGURE 1 at 138. The loading platform 26 carrying hot tray 18 is not therefore allowed to follow quench elevator 72 further toward quench media 20 in container 12. Quench elevator 72 however is driven down into container 12 by power unit 124 where the inverted hot articles 16 are quenched.

Quench elevator 72 may then be returned to position 138 where the newly quenched articles 16 may be allowed to drain until another cycle of operation of the particular apparatus 10 is initiated.

In the above illustrative example of the operation of the apparatus of the invention it is assumed that proper controls to cause the operation of the power unit 124 and depression mechanism 42 at the proper time to cause the results indicated and to safeguard against trays full of hot articles 16 from approaching apparatus 10 until the apparatus is ready to receive the trays will be provided. Such controls are old and well known and therefore form no part of the present invention and will not be considered in detail.

It will also be noted that a particular tray 18 and cover 62 in conjunction with small annular articles 16 to be quenched are shown in the figures. The tray 18, cover 62 and articles 16 have been used only by way of illustration and are not meant to limit applicant's invention in any way, since the substitution of different covers and trays will be required for different articles to be quenched.

Furthermore, while the particular embodiment of the invention just described has been discussed with reference to the quenching of hot articles it will be readily apparent that the material handling apparatus as disclosed or in modified form has other applications in the inverting and transferring or objects between other devices in different processes wherein transfer of articles at a controlled speed without appreciable free fall is desired. Applicant does not therefore wish to be limited in the practice of the invention to either the particular use disclosed or the modification illustrated.

What I claim as my invention is:

1. Article handling apparatus comprising a first article support for receiving articles at a first station, a second article support having a predetermined position relative to said first support, a second station adjacent said first station, means operably associated with both said supports for moving said supports in said predetermined relative position between said first and second stations and for transferring the articles between the supports during such movement of the supports, means at the second station for retaining the first support at the second station, a third station below the first and second stations, and means operably associated with the second support for moving the second support and the articles transferred thereto to the third station while the first support is retained at the second station.

2. Article handling apparatus comprising a first article support for receiving articles at a first station, a second article support having a predetermined position relative to said first support, a second station adjacent said first station, means operably associated with both said supports for moving said supports in said predetermined relative position from said first station to said second station and for transferring the articles from the first support to the second support during such movement of the supports, means at the second station for retaining the first support at the second station, a third station below the first and second stations, means operably associated with the second support for moving the second support and the articles transferred thereto to the third station while the first support is retained at the second station and for thereafter moving the second support and articles transferred thereto from the third station back to the second station, the first mentioned means being subsequently operable to move both said supports in said predetermined relative position between said second and first stations and to retransfer the articles from the second support to the first support during such movement.

3. Article handling apparatus comprising a pair of article supports having a predetermined relative position at a first station, first means operably associated with one of said supports for moving the one support from said first station and out of said predetermined relative position to a second station to receive articles thereon and back into said predetermined relative position at said first station, a third station adjacent said first station, second means operably associated with the supports for moving the supports in the predetermined relative position between the first and third stations and transferring the articles from the one support to the other support in moving the supports between the first and third stations, third means at the third station for retaining the one support at the third station, a fourth station below the third station, and fourth means operably associated with the other support for moving the other support and the articles transferred thereto to the fourth station.

4. Structure as claimed in claim 3 wherein the articles are inverted during transfer between the first and third stations and said first, second and fourth means are operable in reverse order to move the other support back to the third station, to move the supports in the predetermined relative position from the third to the first station and to transfer the articles from the other support to the one support and reinvert them in so doing, and to move the one support from the first to the second station for removal of the articles therefrom.

5. Structure as claimed in claim 3 wherein said one article support comprises a load platform, said other article support comprises a quench elevator, and said means for moving the supports comprises a pair of endless linear members secured to opposite sides of each support, four transversely aligned and spaced sprocket pairs for individually mounting said linear members, drive means connected to one of said pairs of sprockets for driving the quench elevator between the first and fourth positions, and a weight supported by the other pair of linear members for biasing the load platform toward the quench elevator.

6. Structure as claimed in claim 5 wherein said linear members are chains having elongated links, said load platform is secured to the bottoms of transversely and longitudinally aligned links of the other pair of chains and said quench elevator is secured to the tops of transversely and longitudinally aligned links of the other pair of chains and further including abutment means operable between said load platform and quench elevator for maintaining the transversely and longitudinally aligned links of each pair of chains in longitudinal alignment with the platform and elevator spaced by one chain link length.

7. Structure as claimed in claim 6 wherein said first means comprises an abutment on the loading platform, a pivotally mounted lever engageable with the abutment on pivoting thereof and selectively actuable piston and cylinder means secured to the lever operable to cause pivoting thereof.

8. Article transfer apparatus comprising two pairs of sprockets spaced apart transversely and aligned axially, the two sprockets of each pair being spaced apart vertically, an endless chain having elongated links extending around each pair of sprockets, separate article supporting means secured to the bottom of a first link of one chain and the top of a second link of the other chain and abutment means operable between said supporting means for maintaining said first and second elongated links aligned longitudinally of the chains during rotation of said sprockets whereby the relative position of the supporting means is maintained on movement thereof around said sprockets and means for rotating the sprockets together.

References Cited in the file of this patent

UNITED STATES PATENTS

| | | |
|---|---|---|
| 2,352,709 | Haase | July 4, 1944 |
| 2,365,007 | Rideout et al. | Dec. 12, 1944 |
| 2,577,091 | Porter | Dec. 4, 1951 |
| 2,684,681 | Wallerius et al. | July 27, 1954 |
| 2,716,989 | Joy | Sept. 6, 1955 |
| 2,919,010 | Hautau et al. | Dec. 29, 1959 |

FOREIGN PATENTS

| | | |
|---|---|---|
| 797,370 | Great Britain | July 2, 1958 |